Nov. 28, 1972   R. FREAKE ET AL   3,704,206
DEVICE FOR THE DETECTION OF BACTERIA IN AQUEOUS FLUIDS
Filed Feb. 25, 1971

INVENTORS
RONALD FREAKE
CLAUDE RAY GUNTER
BILLY HARPER HADEN
NAGESH SHAMRAO MHATRE
BY *Harry J. Stephenson*
ATTORNEY _United States Patent Office_

3,704,206
Patented Nov. 28, 1972

3,704,206
DEVICE FOR THE DETECTION OF BACTERIA IN AQUEOUS FLUIDS
Ronald Freake, Claude Ray Gunter, Billy Harpen Haden, and Nagesh Shamrao Mhatre, Elkhart, Ind., assignors to Miles Laboratories, Inc., Elkhart, Ind.
Filed Feb. 25, 1971, Ser. No. 118,663
Int. Cl. C12k 1/04
U.S. Cl. 195—127         3 Claims

ABSTRACT OF THE DISCLOSURE

A method and device for detecting bacteria in aqueous fluids is disclosed consisting essentially of a two component system, the first component comprising a stable peroxide and the second a peroxide detecting system. In use the fluid being tested is initially contacted with the first component comprising the peroxide whereby certain bacterial components, if present in the fluid, react with and degrade the peroxide. The test fluid is then contacted with the peroxide detecting system for measurement of peroxide degradation. A detected decrease in peroxide in the test fluid is indicative of the presence of bacteria therein. A preferable embodiment of the present invention comprises a unitized device wherein the two components are contained in individual matrices.

BACKGROUND OF THE INVENTION

Since the discovery that microorganisms such as bacteria are one of the major causes of diseased states in animals and humans, numerous means have been proposed to control such organisms. A primary adjunct in controlling microorganisms is a means for detecting the presence or absence thereof. Examination of certain body fluids for the presence of microorganisms, such as in the detection of bacteria in urine, provides information useful to the physician in the diagnosis of certain diseased conditions, and to this end, numerous test systems and devices for detecting bacteria have been proposed and developed over the years.

DESCRIPTION OF THE PRIOR ART

A comprehensive description of the prior art relating to bacteria and microorganism testing and detecting means is beyond the scope of this specification. Briefly, however, it may be stated that in order to achieve any degree of accuracy and reliability, such methods usually comprise inoculating a specially formulated growth medium with the fluid being tested, incubating this system under standardizing conditions and observing the formation of colonies of bacteria or other microorganisms. These methods, needless to say, are time consuming and require the use of skilled technicians and complete laboratory facilities.

In addition to the above incubation tests, numerous simpler chemical tests have appeared over the years. Recently, Broude, in the J. Chim. Invest. 38: 990 (1959) proposed a completely liquid laboratory test based on the decomposition of peroxide by catalase in bacteria with the concomitant release of gaseous oxygen bubbles in the liquid system. In such a test a positive result is indicated by the formation of bubbles. He later improved his test by utilizing a disc to contain the sample being tested, placing the disc in a tube and adding a solution of hydrogen peroxide thereto. A positive test for bacteria is indicated by the floatation of the disc caused by the release of oxygen bubbles. This improvement is described in the J. Lab. Clin. Med. 57: 490-494 (1961). These tests are obviously primarily laboratory methods and require the use of laboratory facilities and reagents.

SUMMARY OF THE INVENTION

It has now been found that by utilizing a test system as described herein, a rapid and facile determination of the microorganism content of aqueous fluids can be achieved. The method and system basically comprise contacting the fluid with a stable peroxide preferably contained in a first matrix such as bibulous paper, allowing any bacteria or bacterial substance in the fluid to react with and decompose the peroxide, and thereafter contacting the fluid with a peroxide detecting system. If bacteria are present in the fluid being tested, the response will be negative to the presence of peroxide; whereas, if bacteria are not present, the response will be positive. The peroxide detecting system is preferably contained in a second matrix which can readily be contacted with the test fluid after contact thereof with the peroxide reacting system in the first matrix.

DESCRIPTION OF THE PREFERRED EMBODIMENTS

Figure 1:
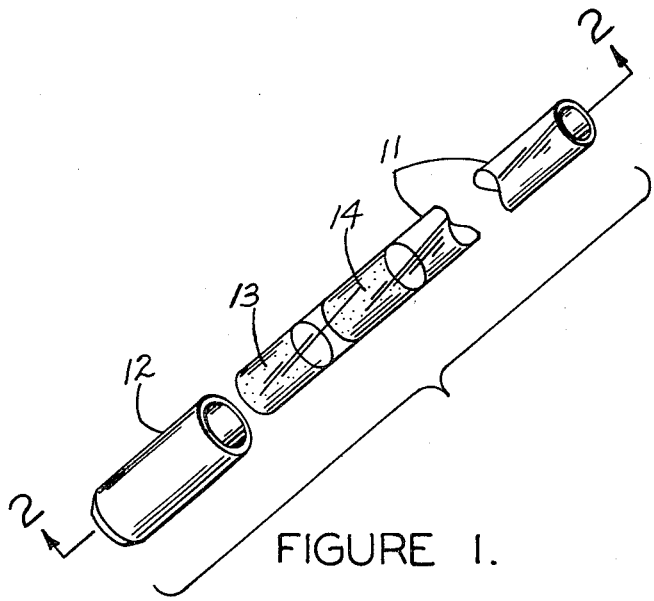
FIG. 1 is an exploded perspective view of a unitized device utilizing the concepts disclosed herein.

The test systems according to the present invention comprise at least two separate but associated components. The first contains a stable peroxide with which the fluid is first contacted and allowed to react. After a predetermined period of time, some or all of the fluid is then transferred to a peroxide detecting system and the degree of peroxide degradation assessed.

A preferable embodiment of the present invention comprises incorporating each of the above components in separate matrices as will be described hereinafter. As the first matrix which contains the stable peroxide, any of various bibulous materials, such as paper, cloth, polymeric sponge materials, and so forth may be used. The only criteria for such a matrix is that it retains the stable peroxide during the reaction thereof with bacterial components in the fluid being tests and that the matrix be inert toward the bacteria and the peroxide, as well as toward any reaction of the bacteria with the peroxide. After the initial contact with the first matrix, all or a portion of the fluid being tested must be transferable from this first matrix to a second matrix containing the peroxide detecting system. As a second matrix, any carrier may be used which is inert toward and retains the peroxide detecting system in a position to contact the fluid from the first matrix. Suitable materials include the bibulous materials described as applicable for use as the first matrix and, in addition, carriers which simply retain the peroxide detecting system in or on the matrix, such as plastics having an adhesive surface.

As the stable peroxide, one may use any inorganic or organic peroxide or hydroperoxide which (1) is susceptible to degradation or decomposition by reaction with bacteria or bacterial and/or other cellular components, such as catalase, (2) is reactable with the peroxide detection system to give a response thereto, and (3) is storage stable. Exemplary of the peroxides which can be used are calcium peroxide, strontium peroxide, barium peroxide, cumen hydroperoxide, diisopropylbenzene hydroperoxide, ethyl hydroperoxide, para-menthane hydroperoxide, and the like. Certain of these peroxides may require encapsulation in a colloid material, such as gelatin, by procedures well known in the art.

The concentration of peroxide used in the first component depends on the desired sensitivity of the test to bacterial population. Generally speaking, the ratio of peroxide to bacteria should be such that the concentration of bacteria in the fluid being tested will decompose sufficient peroxide to give a negative or decreased response when the fluid being tested subsequently contacts the peroxide detecting system. For example, in testing for bacteria in urine (bacteriuria), the system must give a response to about $10^5$ organisms per ml. It has been found that in such a system an amount of stable peroxide equivalent to about from $8.7 \times 10^{-4}$ M to $12.5 \times 10^{-4}$ M hydrogen peroxide solution may be used when the peroxide detecting system comprises peroxidase and o-tolidine as will be described hereinafter.

After the required time of reaction, which usually is less than about 15 minutes, all or a portion of the fluid being tested is contacted with the peroxide detecting system. Although numerous detecting systems may be used, it has been found that the use of a material having peroxidative activity and a chromogen responsive to peroxide in the presence of the peroxidative active material, is ideally suited to the present device.

The material having peroxidative activity is and as used herein is defined as, any material which catalyzes the response of an oxidation-reduction indicator or chromogen to the peroxide carried through from the reaction of the bacteria or bacterial components with the stable peroxide. Usually this material is a peroxidase which may be derived from natural sources such as potatoes, horseradish, fig tree sap, turnips and the like. In addition other materials which are not true peroxidase enzymes may be used. Such substances include inter alia, hemin, oxyhemoglobin, urohemin and certain molybdate-iodide complexes.

The second constituent of the second component is a chromogenic substance, usually an oxidation-reduction indicator, which is responsive to peroxide in the presence of the peroxidative active material. A single indicator may be utilized or, if desired, a plurality of such materials may be employed to give the desired color response. Such indicators include, for example, o-tolidine, o-dianisidine, gum guaiac, 2,7-diaminofluorene and the like. In addition, a background dyestuff may be utilized which will give a chromogenic response which changes from one color to another.

In order to gain further insight into the construction and operation of the devices of the present invention, reference may be made to the drawings.

In FIG. 1, an elongated strawlike, open-ended transparent or translucent tube 11 is used enclose at one end thereof a first matrix 13 in the form of a bibulous cylindrical paper plug previously impregnated with a stable peroxide. This first matrix 13 is fitted snugly but slidably into the tube 11. A second matrix 14 of the same shape and construction as first matrix 13 is securely fitted into tube 11 at a position spaced slightly away from first matrix 13. Second matrix 14 is previously impregnated with a chromogenically responsive peroxide detecting reagent prior to being fitted into tube 11. A cap means 12 is capable of being removably fitted over the end of tube 11 containing the first matrix 13.

Figure 2:
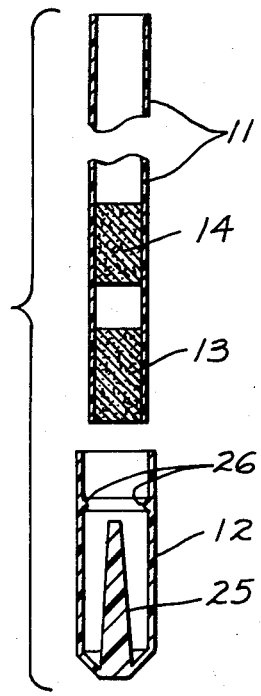
FIG. 2 is an axial cross sectional view of the device shown in FIG. 1.

As shown most clearly in FIG. 2 the first matrix 13 is positioned at one end of the tube 11, and the second matrix 14 is spaced axially from but close to the first matrix 13. Cap means 12 is shown in a detached position in FIGS. 1 and 2. A bead-like internal rim 26 is formed on the inside of the open end portion of cap means 12 and a pedestal 25 in the form of a rigid truncated cone-like projection extends axially within the cap means 12 from the closed end thereof to a point short of the rim 26. Pedestal 25 has a maximum diameter no larger than the inner diameter of the tube 11.

In use, the end of the tube 11 at which the matrix 13 is exposed is immersed in a sample of the fluid being tested for a period sufficient to allow the fluid to migrate into and saturate said matrix, after which tube 11 is removed from the sample. Cap means 11 is then placed telescopically over the end of tube 11 containing matrix 13, with the rim 26 in contact with adjacent tube end. After a predetermined reaction time sufficient to permit any bacteria or bacterial components contained in the fluid to degrade the peroxide impregnated into the matrix 13, the cap means 12 is moved axially along the tube 11 so that the rim 26 is forced past the adjacent tube end and the pedestal 25 engages and moves the first matrix 13 axially into a contiguous relationship with second matrix 14. Fluid from matrix 13 then migrates by capillary action into the matrix 14 and, depending upon the concentration of peroxide contained in the migrating fluid, a chromogenic response is achieved at the junction of said matrices.

Figure 3:
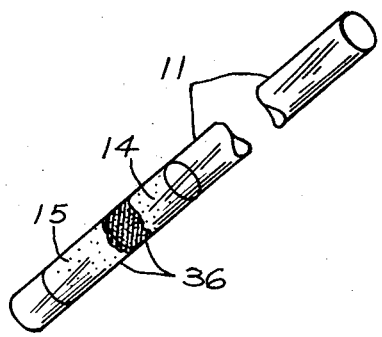
FIG. 3 is a perspective view of the device shown in FIG. 1 after the test reaction has been accomplished.

FIG. 3 shows a device as described in FIGS. 1 and 2 after a test reaction has been effected and with cap means 12 removed. Matrix 13 is shown in contact with matrix 14 in tube 11 and a chromogenic response 36 is shown at the junction of the matrices 13 and 14.

Figure 4:
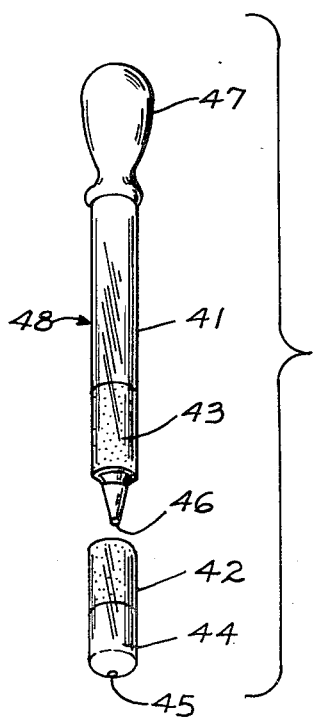
FIG. 4 is an exploded perspective view of another device made according to the present disclosure.

FIG. 4 illustrates another form of test device according to the present invention wherein a glass or plastic dropper 48 has a cylindrical barrel 41 formed with a constricted open tip portion 46 at one end and having rubber squeeze bulb 47 attached to the other end thereof. A plug-like cylindrical first matrix 43 impregnated with a stable peroxide is disposed within the barrel 41 adjacent the tip portion 46. A transparent cylindrical cap means 42 having a small axial opening 45 at the rounded end thereof contains a plug-like cylindrical second matrix 44 impregnated with a peroxide detecting system. In use the fluid to be tested is drawn up from the sample into matrix 43 contained in dropper 41 by means of squeeze bulb 47. After a predetermined reaction time, the fluid is discharged from matrix 43 by means of squeeze bulb 47 into cap means 42 where it contacts the second matrix 44. Any peroxide contained in the discharged test fluid reacts with the peroxide detecting reagent contained in second matrix 44 to give a chromogenic response thereat. Opening 45 at the base of cap means 42 is a vent to allow the fluid to readily penetrate matrix 44.

Obviously, non-inventive modifications of the devices described herein may be made. For example, a syringe may replace the dropper 48 shown in FIG. 4.

The following examples are merely representative of the operation of the systems of the present invention and are not intended to be a limitation thereof.

Example 1

Cylindrical cellulose sponges, approximately 15 mm. in diameter by 8 mm. in length, were impregnated with a suspension of 10 mg. strontium peroxide in 100 ml. of dimethyl sulfoxide with 1.5 g. of colloidal silica and 2 drops of tris(polyoxyethylene)sorbitan monooleate and vacuum dried at 60° C. These impregnated sponges represent the first matrix 13 as shown in FIGS. 1 to 3.

Cylindrical non-woven rayon plugs of the same size as the cellulose sponges described next above were then impregnated with a peroxide detecting reagent comprising:

Polyvinyl pyrrolidone—2. g.+10 ml. H$_2$O
Sodium citrate—3.967 g.  
Citric acid—0.90 g. } +12.2 ml. H$_2$O
Ethyl alcohol—6.1 ml.
Ortho-tolidine·2 HCl—0.122 g.+2.4 ml. H$_2$O
H$_2$O—7.0 ml.
Peroxidase—0.0195 g.+2.4 ml. H$_2$O
Tris(polyoxyethylene)sorbitan monooleate—0.039 g.

The reagent ingredients were mixed in the order shown and after impregnation with the reagent, the plugs were dried at 100° C. These impregnated plugs represent the second matrix 14 of FIGS. 1 to 3.

A device was then constructed by placing the matrices 13 and 14 in tube 11 as depicted in FIGS. 1 and 2. Tube 11 was constructed of a transparent plastic material and was approximately 10 cm. long with an inside diameter the same as the outside diameter of matrices 13 and 14.

The device was then closed with a cap means 12 as shown in FIGS. 1 and 2.

Example 2

After removing the cap means 12 as shown in FIGS. 1 and 2, the matrix end of the device prepared as described in Example 1, was immersed into a urine sample containing $10^5$ bacteria/ml. until the urine completely saturated the first matrix 13 containing the stable peroxide. The cap means 12 was repositioned on the tube 11 so that the matrix end of the tube rested against rim 26. After allowing 15 minutes for any bacterial constituents in the urine to react with the peroxide in the first matrix 13, said matrix was moved axially into contact with the matrix 14 by forcing the cap means 12 further onto tube 11 as previously described. A portion of the fluid contained in first matrix 13 transferred by capillary action to second matrix 14. The second matrix 14, which is initially white in color, remained white when contacted with the fluid from first matrix 13, indicating the presence of $10^5$ or more bacteria/ml. of the urine tested. The presence of a bacteria count of this magnitude in urine is indicative of urinary tract infection.

A control was run by performing all the above steps with a urine sample known to contain no bacterial contamination. A bright blue color developed at the interface of the first and second matrices 13 and 14 when they were contacted with each other.

Example 3

Example 1 was repeated except that barium peroxide was substituted for strontium peroxide in the matrix 13.

The test performed substantially the same as described in Example 2.

Example 4

Example 1 was repeated except that cumen hydroperoxide was substituted for strontium peroxide in the matrix 13. The test performed substantially the same as described in Example 2.

We claim:

1. A device for detecting bacteria in aqueous fluids comprising a first matrix having incorporated therein a predetermined quantity of a stabilized peroxide and a second matrix having incorporated therewith a peroxide detecting system, said first and second matrices being separable but in fluid flow relationship.

2. A device as in claim 1 wherein the peroxide detecting system comprises a peroxidative active material and an indicator chromogenically responsive to peroxide in the presence of the peroxidative active material.

3. A device as in claim 2 wherein the peroxidative active material is peroxidase and the indicator is orthotolidine.

References Cited

UNITED STATES PATENTS

| 3,092,464 | 6/1963 | Adams et al. | 195—103.5 R |
| 3,644,177 | 2/1972 | Zyk | 195—103.5 R |

OTHER REFERENCES

The American Journal of the Medical Sciences, vol. 251, pp. 184–187.

LIONEL M. SHAPIRO, Primary Examiner

R. J. WARDEN, Assistant Examiner

U.S. Cl. X.R.

195—103.5 R